United States Patent
Wu et al.

(10) Patent No.: US 9,217,093 B1
(45) Date of Patent: Dec. 22, 2015

(54) PALLADIUM INK COMPOSITIONS

(71) Applicant: Xerox Corporation, Norwalk, CT (US)

(72) Inventors: Yiliang Wu, Oakville (CA); Biby Esther Abraham, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 42 days.

(21) Appl. No.: 14/292,614

(22) Filed: May 30, 2014

(51) Int. Cl.
  *C09D 11/38* (2014.01)
  *C08K 5/00* (2006.01)

(52) U.S. Cl.
  CPC .............. *C09D 11/38* (2013.01); *C08K 5/0091* (2013.01)

(58) Field of Classification Search
  CPC .... C09D 11/322; C09D 11/40; C09D 11/037; C09D 11/30; C09D 17/003; B41J 2/01; B41J 2/2107
  See application file for complete search history.

(56) References Cited

U.S. PATENT DOCUMENTS

| | | | |
|---|---|---|---|
| 4,368,281 A | 1/1983 | Brummett et al. | |
| 4,668,533 A | 5/1987 | Miller | |
| 7,896,483 B2 | 3/2011 | Etheridge | |
| 8,066,805 B2 * | 11/2011 | Zurcher et al. | 106/1.05 |
| 2013/0221288 A1 | 8/2013 | Liu et al. | |

FOREIGN PATENT DOCUMENTS

WO  WO2005/010108  2/2005

OTHER PUBLICATIONS

Qi, W.H., Size and Shape Dependent Melting Temperature of Metallic Nanoparticles, Materials Chemistry and Physics 88 (2004) 280-284.

Philpott, J.E., "Palladium Plating of Printed Circuits", Platinum Metals Re., 1960, 4, (1), 12-14.

* cited by examiner

*Primary Examiner* — Lamson Nguyen
(74) *Attorney, Agent, or Firm* — Pillsbury Winthrop Shaw Pittman LLP

(57) ABSTRACT

An ink includes a palladium salt, an organic amine that forms a palladium complex from the palladium salt, and, at least one solvent, the solvent has a boiling point at about the decomposition temperature of the palladium complex.

20 Claims, 6 Drawing Sheets

PALLADIUM INK COMPOSITIONS

BACKGROUND

Palladium is a rare metal with many unique properties which provide for widespread applications. For example, it can be used as a catalyst to convert harmful gases from automobile combustion into less harmful substances; it can be used in ceramic capacitors, fuel cells, and medical devices. Palladium has also been used in many electronics devices, including printed electronics.

In printed electronics, palladium inks frequently use a two-step process involving palladium salt deposition followed by introduction of a reducing agent to convert palladium (II) to palladium (0) metal. Other techniques may include electroplating and electroless plating. Problems arise with existing techniques due to the complexity of solutions employed and/or concomitant limits in tolerances and/or uniformity that can be achieved with these systems. Other issues with palladium ink deposition technologies include incompatibility of reagents with particular substrates on which the palladium is to be deposited. Thus, the array of substrates on which palladium can be deposited may be limited.

SUMMARY

Figure 1:
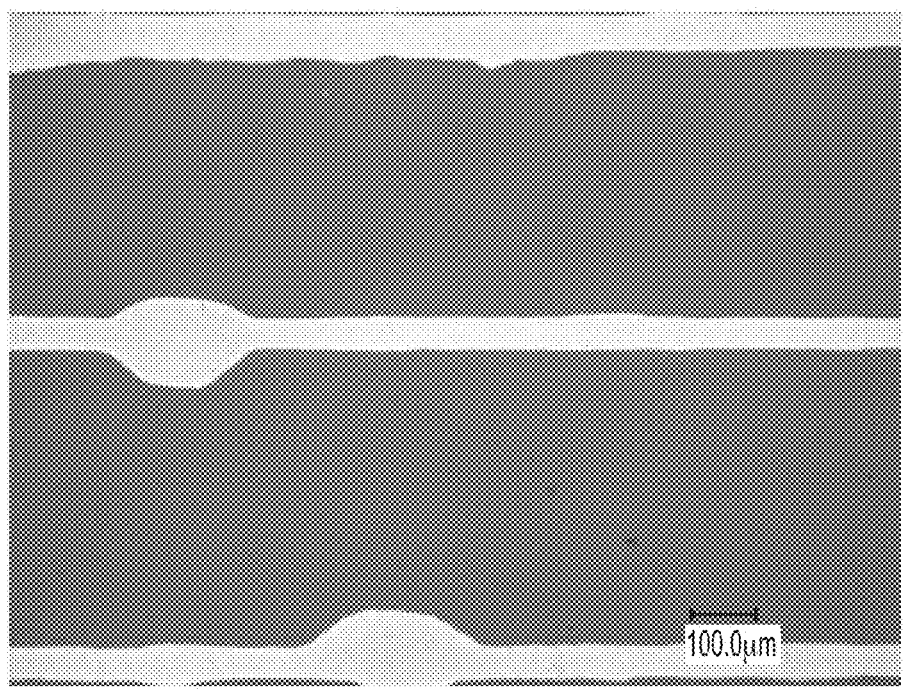
FIG. 1 shows printed fine lines with bulges when employing an exemplary solvent, toluene, having a boiling point below the thermal decomposition temperature.

In some aspects, embodiments disclosed herein provide inks comprising a palladium salt, an organic amine that forms a palladium complex from the palladium salt, and at least one solvent, wherein the at least one solvent has a boiling point at about the decomposition temperature of the palladium complex.

In some aspects, embodiments disclosed herein provide methods comprising depositing an image with an ink on a substrate, the ink comprising a palladium salt, an organic amine that forms a palladium complex from the palladium salt, and at least one solvent, wherein the at least one solvent has a boiling point at about a decomposition temperature of the palladium complex, and heating the deposited image to the decomposition temperature of the palladium complex, wherein the deposited image is substantially preserved during heating without bulging or de-wetting.

In some aspects, embodiments disclosed herein provide ink formulations comprising palladium acetate, n-octylamine, and a hydrocarbon solvent having a boiling point from about 140° C. to about 180° C.

DETAILED DESCRIPTION

Embodiments disclosed herein provide inks comprising palladium salts, organic amines that form palladium complexes from the palladium salts, and at least one solvent, wherein the at least one solvent has a boiling point at about the decomposition temperature of the palladium complexes. In particular embodiments, the inks comprise one or more solvents having an effective boiling point in a range from about 140° C. to about 190° C.

It is generally desirable to deposit palladium in the fabrication of various devices using a low cost approach, such as inkjet printing, rather than conventional methods such as electroplating, electroless plating or sputtering methods. The inks provided herein are printable palladium compositions particularly suited for inkjet printing.

The inks disclosed herein are simplified compositions compared to other printable palladium inks in the art, especially those requiring two-component printing compositions with a reducing agent composition requiring separate application. By contrast, the inks disclosed herein are single component systems suitable for long term storage and provide for convenient cartridge packaging with long shelf life.

Still further, the inks disclosed herein exhibit good printed line morphologies avoiding both bulging and de-wetting when operating close to palladium complex decomposition temperatures. Embodiments disclosed herein provide inkjettable palladium ink formulation for printing uniform palladium features such as lines and dots. Such features can be combined into useful assemblies such as printed circuit boards, printed metal films, and the like. Such features can be used in other applications such as patterned catalyst structures.

The particular palladium salt, organic amine, and solvent combination employed in the inks can be tuned to a target decomposition temperature for thermal compatibility with the substrate on which the ink is to be printed. Because the inks and methods of using the inks avoid the use of harsh chemical agents, including strong acids, bases, or strong reducing agents, the neutral thermal conditions provide access to printed palladium circuitry on otherwise challenging substrates, such as polyesters, polyimide, PEEK, PSN, and the like. These and other advantages of the inks disclosed herein will be apparent to those skilled in the art.

As used herein, "palladium salt" refers to any salt of palladium in its non-zero oxidation state. Common oxidation states of palladium are 0 (i.e., zero-valent metal), +1, +2 and +4, with +2 palladium salts currently being the most commonly commercially available salts.

As used herein "organic amine" refers to an organic compound with an amine (primary $NH_2$ or secondary NHR, R typically being a $C_1$-$C_4$ lower alkyl fragment) functionality capable of serving as a ligand on a metal center. In particular embodiments, the "organic amine" is an aliphatic amine. Aliphatic amines include alkanes, alkenes, and alkynes.

As used herein, "complex" refers to a metal atom having one or more organic ligands associated therewith via bonds which can be dative, ionic, coordinative, or covalent in nature. The nature of the bond is typically governed by the electron affinities of the respective components and the surrounding pH, and may have characteristics of any of the bonding motifs.

As used herein, "decomposition temperature," when used in reference to the palladium complexes formed from the palladium salt and the organic amine, refers to the temperature at which the palladium ion in the complex is reduced from its present oxidation state to its zero-valent metal oxidation state. For example, the decomposition temperature of a palladium (II) complex, is the temperature at which palladium (II) is thermally converted to palladium (0). In accordance with embodiments disclosed herein, this reduction is achieved without the need for introducing secondary reducing agents in a separate step. Without being bound by theory, the organic amine of the palladium complex may serve as the reducing agent for this reaction. The "decomposition temperature" can be approximated visually by the emergence of palladium nanoparticles (black in contrast to the light yellow or clear complex) and/or metallic palladium on the substrate on which it is disposed.

While embodiments herein are directed predominantly to palladium-based inks, those skilled in the art, along with the guidance provided herein, will appreciate the applicability of the methodology to the preparation of inks with other metals including, without limitation, silver, gold, platinum, rhodium, copper, tin, iridium, nickel, or combinations of metals. Palladium metal, in particular, has broad applications making the disclosed inks and methods of using the same particularly useful.

A variety of metal salts may be used in an ink formulation provided that such metal salts readily form amine complexes and provide sufficiently low decomposition temperatures for substrate compatibility. In particular embodiments, metal salt-organic amine combinations are particularly suitable when the resultant complex is in a liquid form rather than solid form at about 30° C. or at room temperature, although solids may also be used when coupled with an appropriate solvent for inkjet compatible viscosity profiles. Suitable metal salts include, without limitation, metal acetates, metal halides, metal acetylacetonates, metal formates, metal nitrates, metal nitrites, metal oxides, metal gluconates, metal fluoroborates, metal alkylsulfonates, metal sulfates, metal sulfites, metal thiosulfates, metal thiocyanates, and metal cyanides.

In embodiments, the metal salts are salts of a weak acid, such as acetate or carbonate. In embodiments, where a metal formate is sufficiently stable, it may be employed in an ink composition. In such embodiments, the formate ligand may serve as an internal reducing agent such that the formate salt alone may be used in the ink absent even an organic amine ligand, although inclusion of an organic amine may still be desirable for achieving good inkjetting properties. For example, the organic amine may provide an appropriate viscosity or provide the palladium complex in a convenient liquid phase.

Exemplary metal salts include, without limitation, palladium acetate, palladium acetylacetone, palladium carbonate, palladium chloride, palladium sodium chloride, palladium potassium chloride, palladium ammonium chloride, palladium sulfate, palladium nitrate, palladium oxide, silver nitrate, silver oxide, cobalt acetate, cobalt chloride, cobalt nitrate, cobalt sulfate, nickel sulfate, nickel methanesulfonate, nickel acetate, nickel fluoroborate, gold chloride, potassium gold cyanide, gold sulfite, gold thiosulfate, gold thiocyanate, copper sulfate, copper formate, copper gluconate, copper acetate, copper nitrate, ruthenium chloride, tin chloride. Where metal ions have more than one oxidation state available, any convenient form may be used, with the proviso that it should be reducible to its zero-valent metal form either under inkjetting conditions or subsequent heating/annealing steps. For palladium inks, in particular, the palladium salt may be palladium acetate or palladium carbonate. In embodiments, the palladium salt is palladium acetate.

In embodiments, inks disclosed herein comprise an organic amine component which may form a complex with the palladium salt. Such amines may be monodentate, bidentate, tridentate ligands, and so on, i.e., any multidentate ligand. Exemplary multidentate ligands include, without limitation, 1,2-diaminopropane, 1,3-diaminopropane, diethylenetriamine, 1,4-diaminobutane, 1,6-diaminohexane, N,N'-dimethyl-1,3-propanediamine, N,N,N',N'-tetramethylethylenediamine, 2-hydroxy-1,3-diaminopropane.

The organic amines may be aliphatic straight-chain or branched monoamines or diamines, such as ethylenediamine, or triamines. In embodiments, the organic amine is an aliphatic amine having 7 to 18 carbon atoms. The organic amine may be selected from the group consisting of propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, and N,N,N',N'-tetramethylbutane-1,4-diamine, and mixtures thereof.

The selection of an organic amine may depend on, inter alia, the particular metal salt and the target viscosity when combined with solvent. In embodiments, the amine is selected to form a metal complex that is a liquid at about 30° C. or at room temperature (about 23 to about 25° C.). Another factor in the selection of amine may include its volatility. Without being bound by theory, at elevated temperatures the amine may serve as an internal reducing agent. Thus, it may be beneficial to have an amine of sufficient molecular weight that it does not volatilize too easily. Volatility may also be modulated via degree of hydrogen bonding. On the other hand, it may also be beneficial to have sufficiently volatile amine-related byproducts such that after reduction of the palladium complex to zero-valent palladium (or other zero-valent metal) minimal carbonaceous residue is left behind. In the interest of balancing these effects, the organic amine may be an aliphatic amine having about 7 to about 9 carbon atoms. In embodiments, the organic amine is n-octylamine.

While embodiments disclosed herein describe the use of organic amines to provide a thermally degradable palladium complex, those skilled in the art, with the benefit of the guidance herein, will recognize that other ligands may be employed that perform substantially the same function. Such ligands may include, without limitation, organic thiols (i.e., mercaptans), thioethers, and xanthic acid.

In embodiments, the one or more solvents have a boiling point between about 140° C. to about 220° C., including from about 140° C. to about 190° C., or from about 140° C. to about 180° C. This temperature range may be specific to the palladium complexes contemplated herein. Thus, other metal complexes besides palladium will be understood to have decomposition temperatures that might fall outside these recited ranges. In order to determine an appropriate solvent for other metal salts, simple visual observation of metal plating can be used in screening solvent conditions. As shown in the Examples below for the palladium complexes, smooth thermal decomposition to palladium zero begins at about 140° C. Although in principle there is no upper limit for the thermal decomposition temperature, de-wetting can be observed in some metal complex decomposition systems. This was observed in the palladium Examples below. Thus, in accordance with embodiments herein, palladium inks employ solvents having a boiling point in a range from about 140° C. to about 190° C., or from about 140° C. to about 180° C., or from about 140° C. to about 160° C.

In embodiments, the solvent does not include hydroxylic solvents or other protic solvents. In embodiments, the solvent does not include solvents that can compete as ligands to bind to the metal center, thus further excluding polar aprotic solvents. In embodiments, the one or more solvents are hydrocarbon-based solvents, and in particular embodiments, aromatic hydrocarbon solvents. In embodiments, the solvent is selected from the group consisting of t-butylbenzyne, m-xylene, ethylbenzene, propylbenzene, trimethylbenzene, methyl ethylbenzene, diethylbenzene, methyl propylbenzene, pentylbenzene, and mixtures thereof.

In embodiments, the fully formulated inks are Newtonian fluids. In embodiments, the inks have a viscosity in a range from about 5 cps to about 30 cps at about 40° C., including from about 5 cps to about 25 cps, or from about 5 to about 20 cps. That is, the viscosity range is selected appropriately for inkjet printing applications. The target viscosity can be obtained by varying the organic amine, the one or more solvents, or both. For example, increasing carbon chain length of a straight chain alkylamine can be used to increase viscosity.

In embodiments there are provided methods comprising depositing an image with an ink on a substrate, the ink comprising a palladium salt, an organic amine that forms a palladium complex from the palladium salt, and at least one solvent, wherein the at least one solvent has a boiling point at about a decomposition temperature of the palladium complex, and heating the deposited image to the decomposition temperature of the palladium complex, wherein the deposited image is substantially preserved during heating without bulging or de-wetting. In embodiments, the depositing step is carried out by inkjet printing.

In embodiments, the substrate on which the ink is deposited may be any insulating material, such as an insulating plastic, glass, or the like. In embodiments, the substrate may be multilayered. The substrate top layer in a multilayered structure may be insulating and optionally, this top layer may have discontinuities, i.e., areas (holes, lines, and the like) that expose lower layers to allow for electrical communication between the printed palladium ink and one or more of the lower layers. In some embodiments, a separate pattern may be printed on opposing sides of an insulating substrate or multilayer substrate. In some such embodiments, there may be one or more intervening insulating layers. The patterns printed on opposing sides may be optionally configured to be in electrical communication with each other. In embodiments, the image on the substrate may be a printed circuit, a thin film, or the like.

Without being bound by theory, it is believed that the palladium complexes disclosed herein decompose into bulk palladium metal via intermediate palladium nanoparticles. Thus, the heating step may provide palladium nanoparticles. It has been indicated that the melting point of metal nanoparticles may be lower than bulk metal. Qi et al. Materials Chem. Phys. 88:280-284 (2004). Where the nanoparticles are sufficiently small, such as less than about 5 nm, or less than about 1 nm, a melting point depression may be observed. The melting point depression may enable annealing of the nanoparticles under reduced pressure. Thus, in embodiments, the heating step may be performed under reduced pressure to encourage annealing.

In embodiments, methods disclosed herein further comprise annealing the image at a temperature in a range from about 200° C. to about 250° C. Such an annealing step may be performed separately from the heating step used to effect thermal decomposition of the palladium complex. In embodiments, the heating and annealing may be combined via stepped or gradual heating up to annealing temperatures.

During solvent evaporation palladium complex decomposition takes place simultaneously allowing precise printed features to be formed without significant distortion. In some embodiments, there may be some small amount of shrinkage, albeit substantially uniform.

In embodiments, the ink-jettable compositions containing the palladium complex can be ink-jetted onto a substrate in a predetermined pattern. The predetermined pattern can correspond to a conductive pathway such as a circuit, a portion of a circuit, or other electronic device. In embodiments, the image is a printed circuit. In embodiments, the substrate is a circuit board. In embodiments, the image is a thin-film transistor (TFT).

The substrate may comprise materials including but not limited to silicon, glass plate, plastic film or sheet, and various metals. For structurally flexible devices, plastic substrate, such as for example polyester, polycarbonate, polyimide sheets and the like may be preferred. The thickness of the substrate may be from about 10 micrometers to over 10 millimeters with an exemplary thickness being from about 50 to about 100 micrometers, especially for a flexible plastic substrate and from about 0.5 to about 10 millimeters for a rigid substrate such as glass or silicon.

In embodiments, the substrate may include a dielectric layer. The dielectric layer may be an inorganic material film, an organic polymer film, or an organic-inorganic composite film. Examples of inorganic materials suitable as the dielectric layer include silicon oxide, silicon nitride, aluminum oxide, barium titanate, barium zirconium titanate and the like. Examples of suitable organic polymers include polyesters, polycarbonates, poly(vinyl phenol), polyimides, polystyrene, polymethacrylates, polyacrylates, epoxy resin and the like. The thickness of the dielectric layer depends on the dielectric constant of the material used and can be, for example, from about 10 nanometers to about 500 nanometers. The dielectric layer may have a conductivity that is, for example, less than about $10^{-12}$ Siemens per centimeter (S/cm). The dielectric layer may be formed using conventional processes known in the art, including those processes described in forming a gate electrode.

The dielectric layer may be surface modified with a surface modifier. Exemplary surface modifiers include organosilanes such as hexamethyldisilazane (HMDS), octyltrichlorosilane (OTS-8), octadecyltrichlorosilane (ODTS-18), and phenyltrichlorosilane (PTS). A semiconducting layer may be directly contacted with this modified dielectric layer surface. The contact may be complete or partial. This surface modification can also be considered as forming an interfacial layer between the dielectric layer and the semiconducting layer.

The semiconducting layer may be made from an organic semiconducting material. Examples of organic semiconductors include but are not limited to acenes, such as anthracene, tetracene, pentacene, and substituted pentacenes, perylenes, fullerenes, oligothiophenes, polythiophenes and their substituted derivatives, polypyrrole, poly-p-phenylenes, poly-p-phenylvinylidenes, naphthalenedicarboxylic dianhydrides, naphthalene-bisimides, polynaphthalenes, phthalocyanines such as copper phthalocyanines or zinc phthalocyanines and their substituted derivatives. The semiconductor may also be an inorganic semiconductor such as ZnO, ZnS, silicon nanowires, and the like.

In embodiments, the semiconductors may be polythiophenes. Polythiophenes include, for example, regioregular and regiorandom poly(3-alkylthiophene)s, polythiophenes comprising substituted and unsubstituted thienylene groups, polythiophenes comprising optionally substituted thieno[3,2-b]thiophene and/or optionally substituted thieno[2,3-b]thiophene groups, polythiophenes comprising fused-ring aromatic groups, polythiophenes comprising heteroatom-containing fused-ring aromatic groups, and polythiophenes comprising non-thiophene based aromatic groups such as phenylene, fluorene, furan, and the like.

The semiconducting layer may be from about 5 nanometers to about 1000 nanometers deep, including from about 20 to about 100 nanometers in depth. In certain configurations, the semiconducting layer may completely cover source and drain electrodes. The semiconducting layer may have a channel length defined by the distance between the source and drain electrodes.

The semiconducting layer may be formed by molecular beam deposition, vacuum evaporation, sublimation, spin-on coating, dip coating, printing (e.g., inkjet printing, screen printing, stencil printing, microcontact printing, flexographic printing), and other conventional processes known in the art, including those processes described in forming the gate electrode.

Regarding electrical performance characteristics, the organic semiconductor usually has a conductivity in the range of $10^{-8}$ to $10^{-4}$ S/cm. Various dopants known in the art may also be added to change the conductivity. The organic semiconductor can be either a p-type or n-type semiconductor. For p-type, the semiconductor usually has an energy level (HOMO level) of higher than 4.5 eV. In specific embodiments, the p-type semiconductor has a HOMO level of about 5.1 eV. For n-type, the semiconductor usually has an energy level (LUMO level) of lower than 4.5 eV. In embodiments, the n-type semiconductor has a LUMO level of about 4.0 eV. In embodiments, the semiconductor is a p-type semiconductor. In embodiments, the organic semiconductor is a polythiophene. Polythiophenes generally have a HOMO level of from about 4.7 eV to about 5.5 eV.

The source, drain, and optional gate electrodes may be made from other electrically conductive materials as well. They can be for example, a thin metal film, a conducting polymer film, a conducting film made from conducting ink or paste, or in the case of the gate electrode the substrate itself, for example heavily doped silicon. Other examples of electrode materials include but are not restricted to aluminum, gold, silver, chromium, zinc, indium, conductive metal oxides such as zinc-gallium oxide, indium tin oxide, indium-antimony oxide, conductive polymers such as polystyrene sulfonate-doped poly(3,4-ethylenedioxythiophene) (PSS-PEDOT), and conducting ink/paste comprised of carbon black/graphite. The electrodes can be prepared by vacuum evaporation, sputtering of metals or conductive metal oxides, conventional lithography and etching, chemical vapor deposition, spin coating, casting or printing, or other deposition processes. The thickness of the gate electrode ranges for example from about 10 to about 200 nanometers for metal films and from about 1 to about 10 micrometers for conductive polymers. Typical thicknesses of source and drain electrodes are, for example, from about 40 nanometers to about 1 micrometer, including more specific thicknesses of from about 100 to about 400 nanometers.

If desired, a barrier layer may also be deposited on top of a TFT to protect it from environmental conditions, such as light, oxygen and moisture, etc. which can degrade its electrical properties. Such barrier layers are known in the art and may simply consist of polymers.

The various components of the TFT may be deposited upon the substrate in any order. Generally, however, the gate electrode and the semiconducting layer should both be in contact with the gate dielectric layer. In addition, the source and drain electrodes should both be in contact with the semiconducting layer. The phrase "in any order" includes sequential and simultaneous formation. For example, the source electrode and the drain electrode can be formed simultaneously or sequentially. The term "on" or "upon" the substrate refers to the various layers and components with reference to the substrate as being the bottom or support for the layers and components which are on top of it. In other words, all of the components are on the substrate, even though they do not all directly contact the substrate. For example, both the dielectric layer and the semiconducting layer are on the substrate, even though one layer is closer to the substrate than the other layer.

EXAMPLES

The Examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Control Example 1

In this control Example, a toluene-based ink composition was used directly for inkjet printing.

The coating composition was prepared by dissolving 2.5 g palladium acetate in 6.0 g octylamine and 1.5 g toluene (boiling point about 110° C.). This ink composition had a viscosity of about 30 to about 32 cps at 25° C. After being filtrated through a 0.2 micron syringe filter, the composition was printed with a Dimatix DMP2800 equipped with a 10 pL cartridge. Due to high viscosity at room temperature, the composition could not be jetted at 25° C. or even 40° C. Good drops formed at nozzle temperature of about 60° C. only. When printed on to glass substrate, as shown in FIG. 1, bulges were formed, resulting in non-uniform lines, which are not acceptable for most printed electronic applications.

Example 1

In this Example, a t-butylbenzene based ink composition was used directly for inkjet printing.

Figure 2:
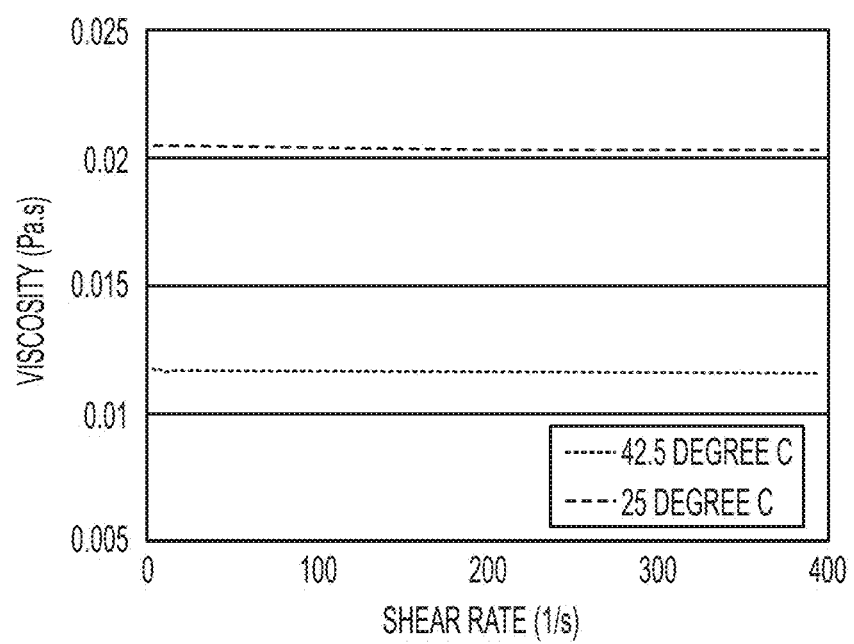
FIG. 2 shows a plot of viscosity as a function of shear rate for an exemplary jettable palladium ink, in accordance with embodiments disclosed herein.

5.0 g Palladium acetate was dissolved into 12 g octylamine to form clear yellow complex. 4.25 g of this complex was diluted with 1.5 g t-butylbenzene to form a jettable ink. This composition was a Newton fluid, as shown in FIG. 2, having a constant viscosity as a function of shear rate. It has a jettable viscosity of about 11.7 cps at about 42.5° C.

Figure 3:
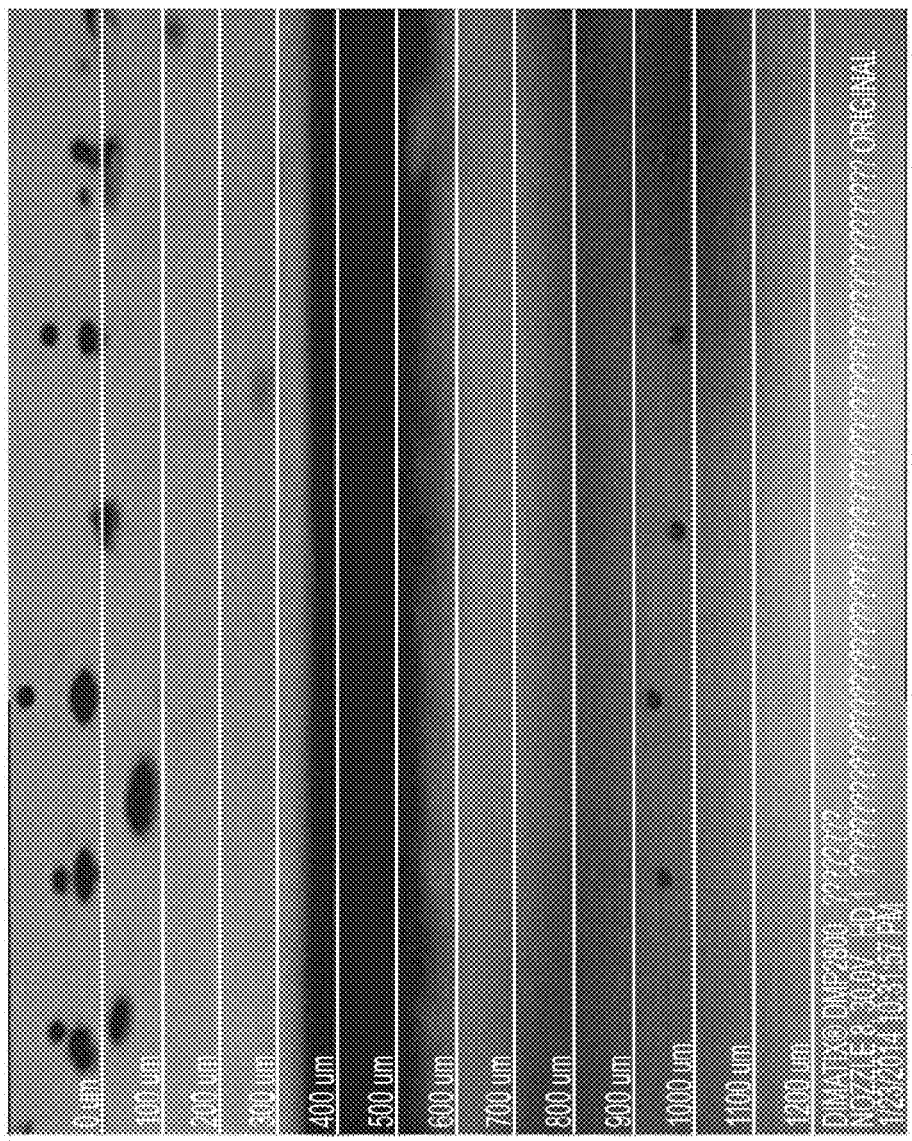
FIG. 3 shows spherical ink droplets at the nozzle temperature of 40° C. employing palladium inks, in accordance with embodiments disclosed herein.

The ink was printed with DMP 2800 inkjet printer. All nozzles performed smoothly, forming spherical drops at the jetting temperature of about 40° C. (FIG. 3). The ink was very stable in the cartridge. After being kept in the cartridge for seven days, no purge was required to start jetting.

Figure 4A:
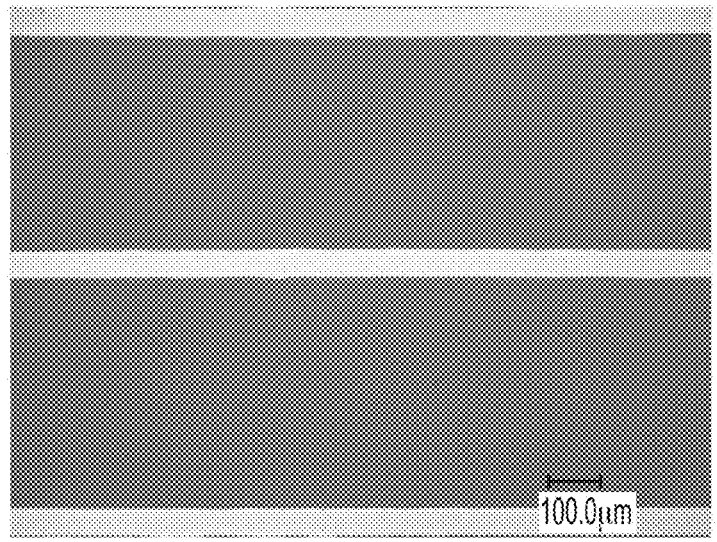
FIG. 4A shows uniform palladium lines printed on glass substrate, in accordance with embodiments disclosed herein
Figure 4B:
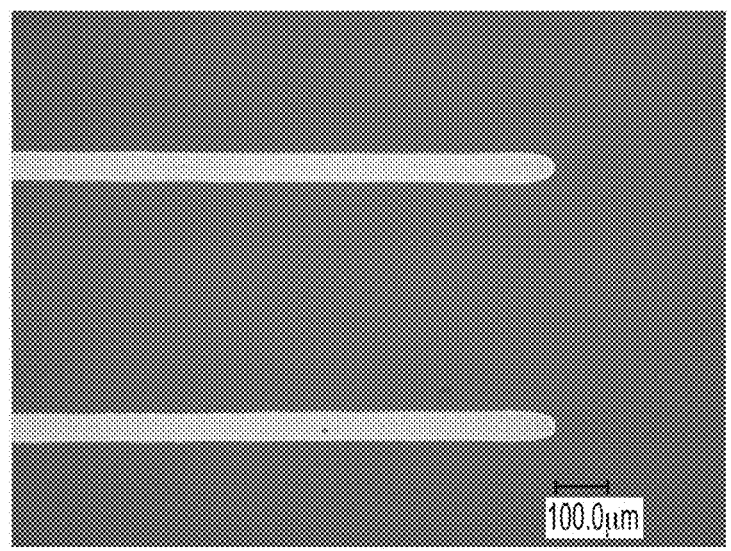
FIG. 4B shows further uniform palladium lines printed on glass substrate, in accordance with embodiments disclosed herein.

When printed on glass substrate, as shown in FIG. 4, very straight lines with uniform line edges were obtained. The line width was about 60 microns. No deformation in line shape was observed upon thermal sintering.

Example 2

In this Example, a mixed solvent t-butylbenzene/m-xylene ink composition was used directly for inkjet printing.

Figures 5A, 5B:
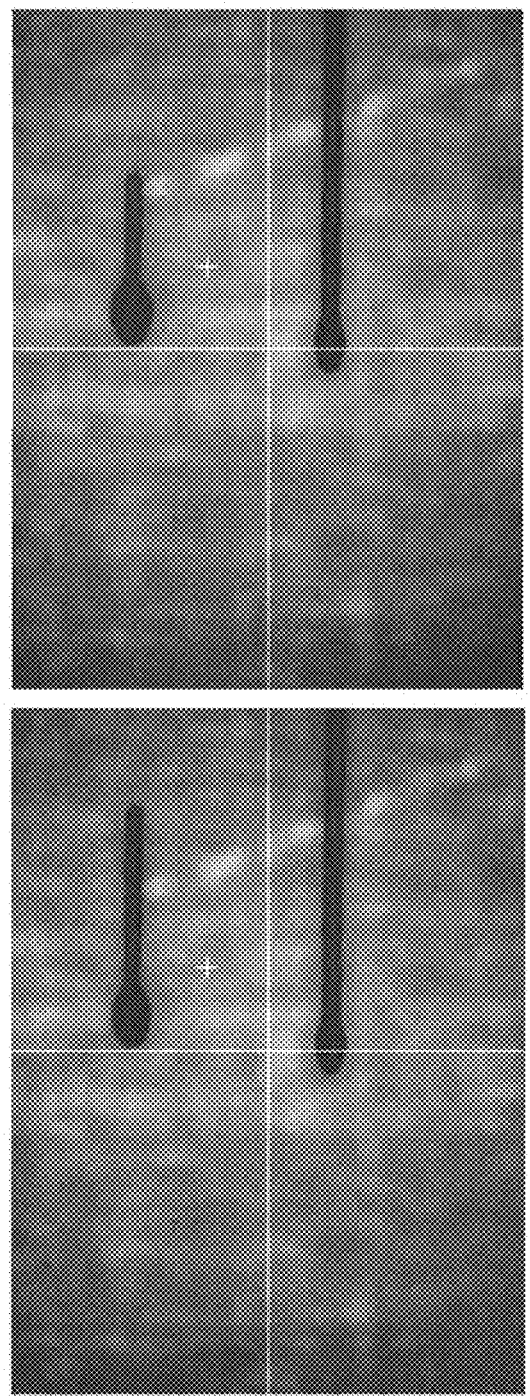
FIG. 5A shows an image of printed palladium ink on a glass substrate, in accordance with embodiments disclosed herein.
FIG. 5B shows the same image as in FIG. 6A taken a few seconds after the left image, showing the shrinking of the printed line during thermal decomposition, in accordance with embodiments disclosed herein.

4.25 g of the above complex (palladium acetate and octylamine) was diluted with 1.0 g t-butylbenzene and 0.5 g m-xylene. The ink composition showed good Newton fluid behavior, with a viscosity of about 10.7 cps at about 42.5° C. Similarly, uniform thin lines about 60 microns could be obtained by jetting at about 40° C. on glass substrate, as shown in FIG. 5.

Control Example 2

In this control Example, the same palladium acetate and octylamine mixture in Example 1 was diluted with 1.2 g t-butylbenzene and 0.3 g pentylbenzene.

Figure 6:
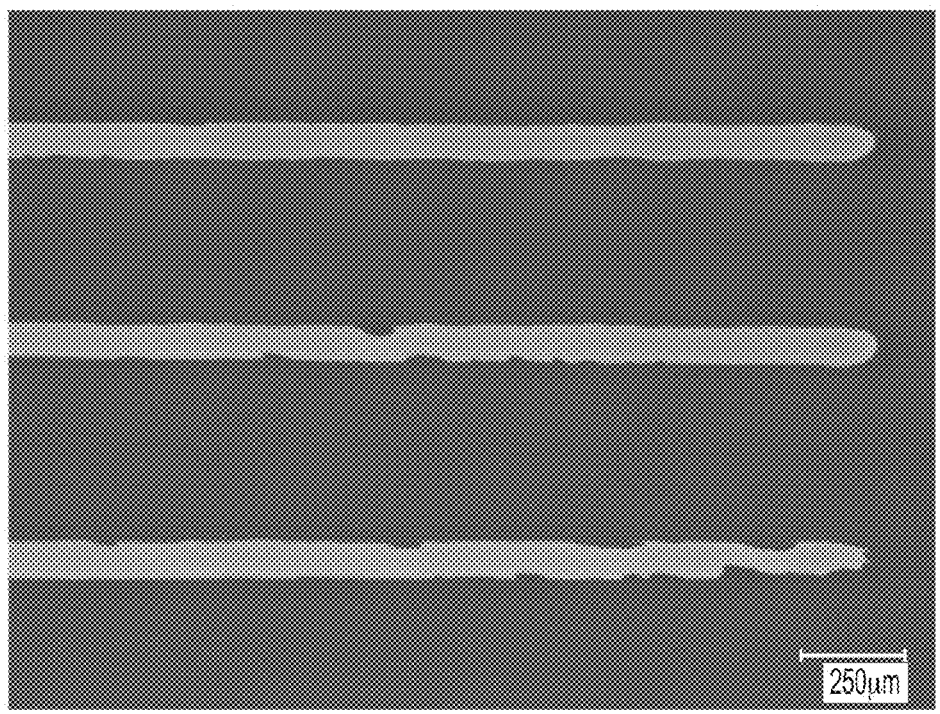
FIG. 6 shows annealed palladium lines on glass substrate indicating de-wetting behavior when solvents higher than decomposition temperatures are employed.

The composition had a viscosity of about 12.3 cps at 42.5° C. When printed, stable drops can be formed at nozzle temperature of about 45° C. FIG. 6 shows the printed lines on glass substrate prior to annealing. The right image was taken a few seconds after the left image. One can see that the printed line was difficult to pin on the glass substrate—the line shrunk upon drying. After thermal annealing, as shown in FIG. 7, some areas of the line edges exhibited de-wetting phenomenon, resulting non-uniform lines.

Example 3

This Example shows the characterization of the palladium acetate-octylamine complex.

A thermogravimetric analysis (TGA) study showed that the palladium-octylamine complex thermally decomposed into palladium nanoparticles at around about 140 to about 180° C. Further annealing the palladium nanoparticles at around 200-250° C. can sinter the particles into continuous palladium layer. In order to achieve good stability in the cartridge and good printed line shape, solvents with boiling point around about 140° C. to about 180° C. perform well. Solvents having a boiling point much lower than the thermal decomposition temperature may dry too fast, causing pooling of the palladium complex resulting in bulge structures. Solvents with substantially higher boiling points than the thermal decomposition temperature may induce palladium nanoparticle de-wetting upon further annealing into palladium layer. Table 1 below summarizes the boiling points of the solvents used in various ink formulations. These experimental results indicate that the solvents with boiling point from about 140° C. to about 180° C. can achieve good jettable inks.

TABLE 1

Boiling point of solvent/co-solvents used for ink formulation.

| Examples/control examples | Solvent and b. p. (° C.) | Co-solvent and b. p. (° C.) |
|---|---|---|
| Control example 1 | Toluene, 110.6 | / |
| Example 1 | t-butylbenzene, 169 | / |
| Example 2 | t-butylbenzene, 169 | m-xylene, 139 |
| Control example 2 | t-butylbenzene, 169 | Pentylbenzene, 205 |

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

What is claimed is:

1. An ink comprising:
   a palladium salt;
   an organic amine that forms a palladium complex from the palladium salt; and
   at least one solvent;
       wherein the at least one solvent has a boiling point at about the decomposition temperature of the palladium complex.

2. The ink of claim 1, wherein the palladium salt is palladium acetate.

3. The ink of claim 1, wherein the organic amine is an aliphatic amine having 7 to 18 carbon atoms.

4. The ink of claim 1, wherein the organic amine is an aliphatic amine having 7 to 9 carbon atoms.

5. The ink of claim 1, wherein the organic amine is n-octylamine.

6. The ink of claim 1, wherein the palladium complex is a liquid at about 30° C.

7. The ink of claim 1, wherein the solvent has a boiling point between about 140° C. to about 220° C.

8. The ink of claim 1, wherein the solvent is selected from the group consisting of t-butylbenzene, iso-butylbenzene, m-xylene, pentylbenzene, ethylbenzene, propylbenzene, tri methylbenzene, methyl ethyl benzene, diethylbenzene, methyl propylbenzene, and mixtures thereof.

9. The ink of claim 1, wherein the ink is a particle-free Newtonian fluid.

10. The ink of claim 1, wherein the ink has a viscosity in a range from about 5 cps to about 30 cps at about 40° C.

11. A method comprising:
    depositing an image with an ink on a substrate, the ink comprising:
       a palladium salt;
       an organic amine that forms a palladium complex from the palladium salt; and
       at least one solvent;
           wherein the at least one solvent has a boiling point at about a decomposition temperature of the palladium complex; and
    heating the deposited image to the decomposition temperature of the palladium complex, wherein the deposited image is substantially preserved during heating without bulging or de-wetting.

12. The method of claim 11, the depositing step is carried out by inkjet printing.

13. The method of claim 11, further comprising annealing the image at a temperature in a range from about 200° C. to about 250° C.

14. The method of claim 11, wherein the image is a printed circuit.

15. The method of claim 11, wherein the organic amine is an aliphatic amine having 7 to 9 carbon atoms.

16. The method of claim 11, wherein the organic amine is n-octylamine.

17. The method of claim 11, wherein the solvent has a boiling point between about 140° C. to about 220° C.

18. The method of claim 11, wherein the heating step generates palladium nanoparticles.

19. The method of claim 18, wherein the nanoparticles are annealed to form palladium layer.

20. An ink formulation comprising:
palladium acetate;
n-octylamine; and
a hydrocarbon solvent having a boiling point from about 140° C. to about 180° C.

* * * * *